United States Patent [19]

Carlin

[11] Patent Number: 4,525,716

[45] Date of Patent: Jun. 25, 1985

[54] TECHNIQUE FOR CANCELLING ANTENNA SIDELOBES

[75] Inventor: James W. Carlin, Holmdel, N.J.

[73] Assignee: AT&T Bell Laboratories, Murray Hill, N.J.

[21] Appl. No.: 648,814

[22] Filed: Sep. 10, 1984

[51] Int. Cl.[3] .......................... G01S 3/16; G01S 3/28

[52] U.S. Cl. .................................... 343/381; 343/380

[58] Field of Search ............... 343/379, 380, 381, 383, 343/384

[56] References Cited

U.S. PATENT DOCUMENTS

| | | | |
|---|---|---|---|
| 3,094,695 | 6/1963 | Jahn | 343/100 |
| 3,202,990 | 8/1965 | Howells | 343/100 |
| 3,803,624 | 4/1974 | Kinsey | 343/854 |
| 3,815,140 | 6/1974 | Buehler et al. | 343/779 |
| 3,876,947 | 4/1975 | Giraudon | 343/383 |
| 4,280,128 | 7/1981 | Masak | 343/380 |
| 4,320,535 | 3/1982 | Brady et al. | 455/278 |
| 4,376,940 | 3/1983 | Miedema | 343/779 |

OTHER PUBLICATIONS

Rassweiler et al., 1978 Midcon, Dec. 12–14, 1978, Dallas, Tex., pp. 1-4.

Mayhan, AP-S, 1979, Seattle, Wash., vol. 1, pp. 190–193.

Bowers et al., AP-S, 1980, Quebec, Canada, vol. 1, pp. 114–117.

*Primary Examiner*—Theodore M. Blum

*Attorney, Agent, or Firm*—Erwin W. Pfeifle

[57] ABSTRACT

The present invention relates to an antenna sidelobe or interference cancellation arrangement including an antenna with a monopulse feed, for providing a sum and difference pattern signal, and an omnidirectional feed for providing a flat pattern signal. The flat pattern signal is used to appropriately shift the lobes of the received difference pattern signal in a first canceller section to substantially correspond to the location of the lobes of the received sum pattern signal. The shifted difference pattern signal is then used to cancel interference in the sum pattern signal in a second canceller section to generate an output signal at the cancellation arrangement which is relatively interference free over a wide band of frequencies.

5 Claims, 3 Drawing Figures

TECHNIQUE FOR CANCELLING ANTENNA SIDELOBES

TECHNICAL FIELD

The present invention relates to an antenna sidelobe or interference cancellation arrangement and, more particularly, to an antenna with a monopulse feed for providing a sum and difference pattern and an omnidirectional feed for providing a flat pattern. The resultant signals from the two feeds are then processed to provide an interference free output signal.

DESCRIPTION OF THE PRIOR ART

Interference in terrestrial and satellite microwave systems from unwanted signals of other systems is a major problem for which designers have spent many years in developing various techniques to remove such interference from desired signals at a receiver. One general technique is to obtain the desired signal via a directional antenna and a sample of an interfering signal via an omnidirectional antenna and then appropriately process the two signals in separate paths before combining the resultant signal to permit cancellation of the interfering signal component in the received desired signal. The processing of the two input signals in the receiver is performed either directly on the currently received signals without feedback as disclosed, for example, in U.S. Pat. Nos. 3,094,695 issued to D. M. Jahn on June 18, 1963 and 3,202,990 issued to P. W. Howells on Aug. 24, 1965, or adaptively by updating the processing of the interfering signal as disclosed, for example, in U.S. Pat. No. 4,320,535 issued to D. M. Brady et al on Mar. 16, 1982. For the above type interference canceller units, it is well known that the amount of interference suppression achievable depends on receiving only the interfering signal with the omni-directional antenna. Any desired signal component present in the interference sample limits the amount of interference suppression.

With monopulse antennas, it is known that pattern distortion results from the requirement of null steering in addition to beam steering. Such distortion effect is always small on the sum beam when nulling the sidelobe region. However, small distortions can cause a significant shift in the difference beam null in such tracking antennas. One technique for adaptive nulling of interferences in the difference pattern of a monopulse antenna is disclosed in the article "Null Steering Effects On Monopulse Array Accuracy" by G. Rassweiler et al in 1978 MIDCON Conference Report, Dec. 12–14, 1978, Dallas Tex. at pages 1–4. There an antenna arrangement uses a set of eight elements forming two squinted amplitude monopulse beams. Phase shifters are adaptively controlled to null the main beam toward a single interference. Another monopulse array antenna arrangement, as disclosed in U.S. Pat. No. 3,803,624 issued to R. R. Kinsey on Apr. 9, 1974, divides the array into four or more separate subarrays arranged in pairs symmetrically about the array center. The subarrays are interconnected through sum and difference couplers to optimize the sum beam gain and the difference beam angular sensitivity.

Methods of interference cancellation have also applied tapped delay line processing arrangements as disclosed in the article "Analysis of Tapped Delay Line Processing For Adaptive Sidelobe Cancellation" by L. Bowers et al in AP-S International Symposium 1980, Quebec, Canada, Vol. 1, at pages 114–117. A nonlinear system structure which is amenable to adaptation using the Least Mean Square (LMS) algorithm and is both an extension of the linear tapped delay line structure and based on a Taylor series representation is disclosed in the article "A Nonlinear Adaptive Noise Canceller" by M. J. Coker et al in ICASSP 80 Proceeding, Apr. 9–11, 1980, Denver, Colo. Vol. 1 at pages 470–473.

The problems remaining in the prior art are to provide interference cancellation in signals received by an offset or axi-symmetric antenna over a wide bandwidth, which can be applied to new antennas or easily retrofitted into existing antennas, and to provide a sample of interference free of the desired signal.

SUMMARY OF THE INVENTION

The foregoing problem in the prior art has been solved in accordance with the present invention which relates to an antenna sidelobe or interference cancellation arrangement and, more particularly, to an antenna with a monopulse feed for providing a sum and difference pattern and an omnidirectional feed for providing a flat pattern. The resultant signal from a difference port of the monopulse feed provides a sample of interference which is free of contamination by the desired signal. The resultant signals from the two feeds are then processed to provide an interference free output signal.

It is an aspect of the present invention to provide an antenna interference cancellation arrangement where the antenna includes a monopulse feed for providing a sum and difference pattern and an omnidirectional feed for providing a flat pattern. The resultant signals from the omnidirectional and monopulse feeds are then processed in a tapped delay line cancellation network wherein the flat pattern is used to appropriately shift the difference pattern in one section of the tapped delay line network to permit the shifted difference pattern, in another section of the tapped delay line network, to provide maximum cancellation of interference in the sum pattern which is then used as the cancellation arrangement output signal.

Other and further aspects of the present invention will become apparent during the course of the following description and by reference to the accompanying drawings.

BRIEF DESCRIPTION OF THE DRAWINGS

Referring to the drawings, in which like numerals represent like parts in the several views.

DETAILED DESCRIPTION

Figure 1:
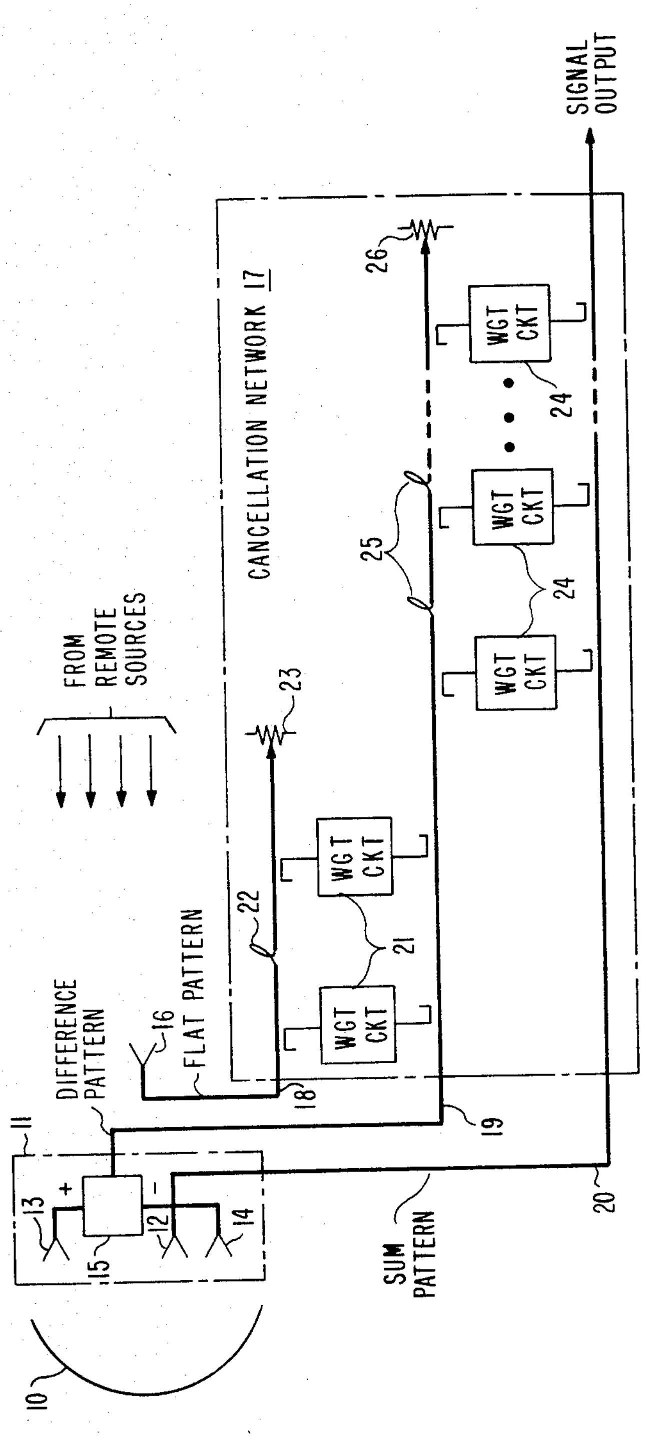
FIG. 1 is a block diagram of the interference cancellation arrangement in accordance with the present invention.

In accordance with the present invention, signals from a desired remote source and undesired signals from one or more remote sources are received at an antenna comprising a main reflector 10, a monopulse feed 11 including a main feed 12 for providing a sum signal pattern and two auxiliary feeds 13 and 14 with a subtracter circuit 15 for providing a difference signal pattern, and an omnidirectional feed 16 for providing a flat pattern of the signals impinging main reflector 10. The three output signal patterns are fed to a cancellation network 17 arranged in accordance with the present invention. Typical voltage and power patterns for the signals from the feeds are shown in FIGS. 2 and 3, respectively.

In cancellation network 17, the flat pattern from omnidirectional feed 16 is delivered to a first path 18 of network 17, the difference pattern from subtracter 15 is delivered to a second path 19 of the network, and the sum pattern from the sum feed 12 is delivered to a third path 20 of the network. Disposed in parallel between paths 18 and 19 are at least two weighting circuits 21, or attenuation means, which couple a predetermined amount of the flat pattern signal propagating along path 18 into the difference pattern signal propagating along path 19. Disposed between each of the adjacent weighting circuits 21 in path 18 is a signal delay means 22 for providing a predetermined amount of time delay to the signal propagating therethrough. Path 18 terminates in a matched load 23 and the elements 21–23 essentially form a first tapped delay line section of cancellation network 17.

The output from the first tapped delay line section on path 19 is provided as a first input to, and path through, a second tapped delay line section of network 17 while the sum pattern on path 20 is provided as a second input to, and path through, the second tapped delay line section of cancellation network 17. The second tapped delay line section includes a plurality of weighting circuits 24, each weighting circuit disposed in parallel with other weighting circuits 24 between paths 19 and 20 and separated from adjacent weighting circuits 24 in path 19 by a delay means 25. Path 19 is terminated in a matched load 26 while the output on path 20 provides the output signal from cancellation network 17.

Figure 2:
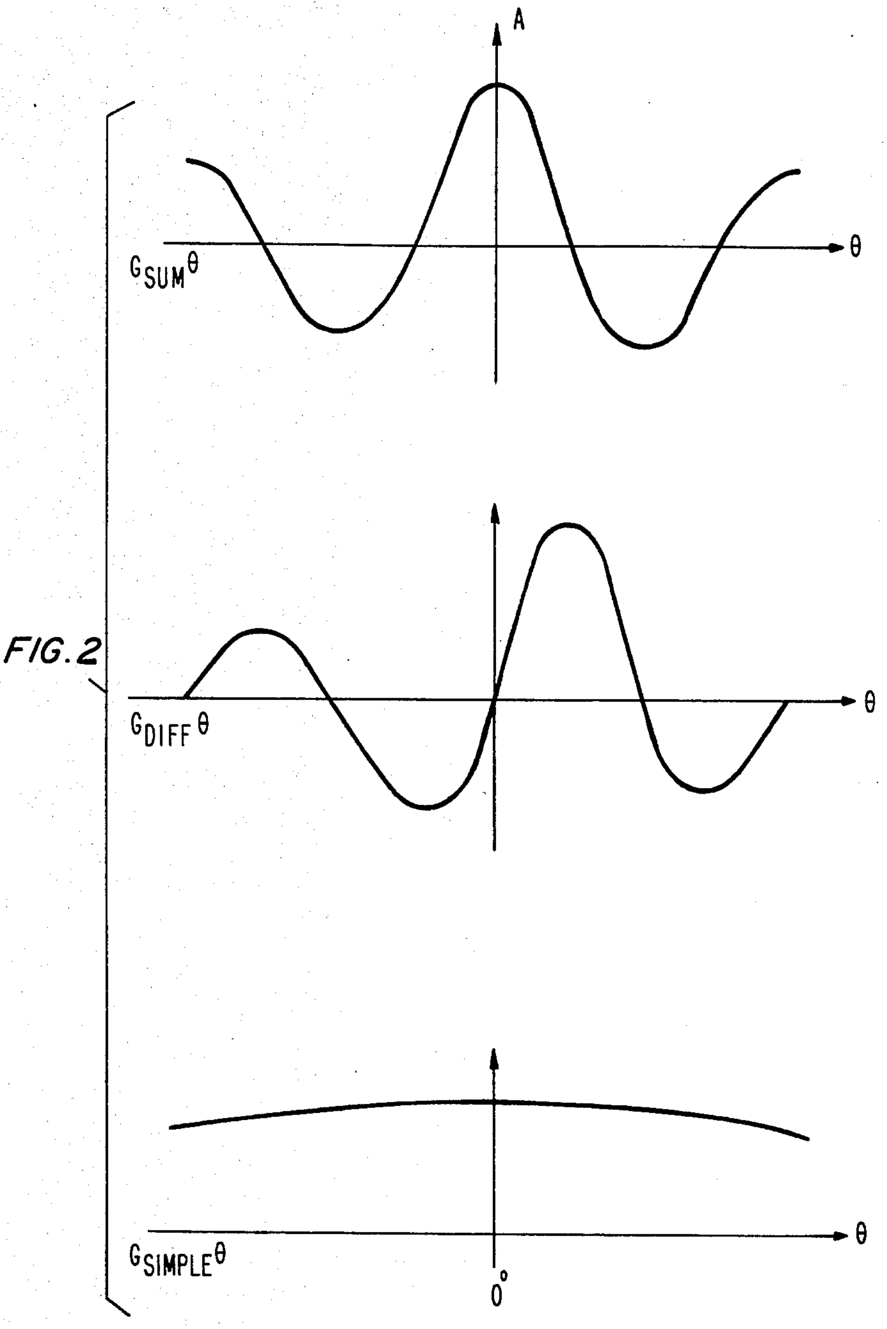
FIG. 2 illustrates typical voltage patterns for the sum, difference, and flat pattern signals provided as inputs to the interference cancellation network of FIG. 1.
Figure 3:
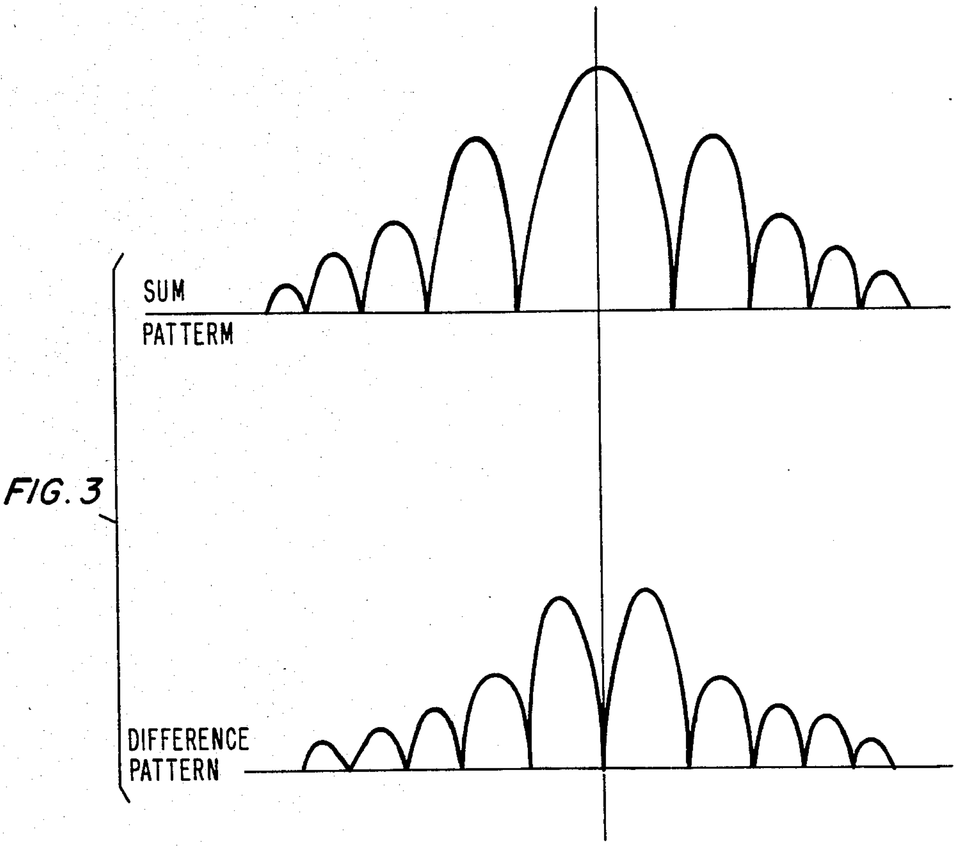
FIG. 3 illustrates typical power patterns for the sum and difference patterns provided as inputs to the interference cancellation network of FIG. 1.

In the typical voltage gain curves of the sum, difference and flat pattern signals provided by the feeds 12, 13–14, and 16, respectively, and shown in FIG. 2, it should be noted that the sum and difference patterns have the same ripple structure but the peaks and nulls are offset by 90 degrees. By appropriately adding the flat pattern signal from feed 16, which can comprise a standard gain feedhorn, to that of the difference pattern signal in the first tapped delay line section, one obtains $$A_1 G_{Diff}(\theta) + A_2 G_{Sample}(\theta) \approx G_{Sum}(\theta) \quad (1)$$

over the desired angular region $\theta_1 \leqq \theta \leqq \theta_2$ for which one desires sidelobe cancellation, which can be a wide bandwidth. In Equation (1), the pattern of flat curve, $G_{Sample}$ of FIG. 2 is appropriately added to the pattern of the $G_{Diff}$ curve of FIG. 2 to appropriately modify the difference pattern to provide a sample of the interfering signal which is substantially in phase with the $G_{Sum}$ pattern of FIG. 2. More particularly, in the cancellation network 17, the first tapped delay line section comprising elements 21–23 functions to appropriately modify the difference pattern signal. The shifted difference pattern signal is then used in the second tapped delay line section comprising elements 24–26 to provide a maximum interference cancellation in the sum signal on path 20 and at the output of cancellation network 17. A multiple number of taps 21 and 24 were used to provide a better match to the required sidelobe angular and frequency response characteristics.

It is to be understood that weighting circuits 21 and 24 can comprise any suitable device as, for example, avariable attenuator or variable gain amplifier for applying the appropriate weight to the signal passing therethrough. The weight to be applied by each weighting circuit 21 and 24 is determined from the characteristics of the received signals and is obtained by trial and error to obtain a maximum interference cancellation in the sum signal at the output of the cancellation network. It is to be understood that there will be some applications where only a monopulse feed difference pattern will be required for wideband cancellation. Examples of this are cases for which the interference arrives from directions within a few beamwidths of the sum pattern maximum for the offset or axi-symmetric antenna. Such case is typical of that required for adjacent satellite interference cancellation. In this case, one of the difference pattern feeds (13) would be positioned in the focal plane of the reflector so that it directly points at the interfering adjacent satellite. The other difference pattern feed (14) would be symmetrically positioned on the other side of the sum feed (12) so that after addition of the two horn (13 and 14) outputs in the difference hybrid (15), one obtains only a sample of interference from the adjacent interfering satellite.

What is claimed is:

1. An antenna sidelobe cancellation arrangement comprising:

a first input for receiving a sum pattern signal from an antenna monopulse feed;

a second input for receiving a difference pattern signal from the antenna monopulse feed;

a third input for receiving a flat pattern signal from a standard gain omnidirectional antenna feed; and a cancellation network comprising:

a first canceller section coupled to the second and third inputs for appropriately shifting the difference pattern signal from the second input by a predetermined amount with the flat pattern signal from the third input to generate an output signal wherein the lobes of the shifted difference pattern signal correspond to the lobes of the sum pattern signal at the first input; and a second canceller section responsive to the output signal from the first canceller section and the sum signal at the first input for introducing appropriate portion of the shifted difference pattern signal into the sum pattern signal for substantially cancelling interference in the sum pattern signal at an output of the cancellation arrangement.

2. A sidelobe cancellation arrangement according to claim 1 where the first canceller section comprises:

a tapped delay line (18) coupled to the third input for receiving the flat pattern signal;

a common line (19) coupled to the second input for receiving the difference pattern signal; and weighting means disposed between each of the taps of the tapped delay line and the common line for transferring a predetermined portion of the flat pattern signal found at each tap into the difference pattern signal in the common line in order to shift the difference pattern signal by a predetermined amount and generate the output signal of the first canceller section.

3. A sidelobe cancellation arrangement according to claim 2 wherein the second canceller section comprises:

a tapped delay line connected to the output of the common line of the first tapped delay line network for receiving the shifted difference pattern signal;

a common line interconnecting the first input and an output of the cancellation arrangement for propagating the sum pattern signal; and weighting means disposed between each of the taps of the tapped delay line and the common line for introducing a predetermined portion of the shifted difference pattern signal from each tap into the sum pattern signal for substantially cancelling interference in the sum pattern signal at the output of the cancellation arrangement.

4. A sidelobe cancellation arrangement according to claim 2 where the second canceller section comprises:

a tapped delay line connected to the output of the first canceller section for receiving the shifted difference pattern signal from the first canceller section;

a common line interconnecting the first input and an output of the cancellation arrangement for propagating the sum pattern signal; and weighting means disposed between each of the taps of the tapped delay line and the common line for introducing a predetermined portion of the shifted difference pattern signal from each tap into the sum pattern signal for substantially cancelling interference in the sum pattern signal at the output of the cancellation arrangement.

5. An antenna sidelobe cancellation arrangement according to claim 1 wherein the difference pattern signal received at the second input from the monopulse feed comprises a first signal and a second signal which is subtracted from said first signal, and one of said first and second signals contains signals substantially only from an interference source when that interference source is within a few beamwidths of a sum pattern signal maximum.

* * * * *